US012681992B2

(12) United States Patent (10) Patent No.: US 12,681,992 B2
Akinwande et al. (45) Date of Patent: Jul. 14, 2026

(54) DETERMINING DEVICE ASSISTANT MANNER OF REPLY

(71) Applicant: INTERNATIONAL BUSINESS MACHINES CORPORATION, Armonk, NY (US)

(72) Inventors: Victor Abayomi Akinwande, Nairobi (KE); Sarbajit K. Rakshit, Kolkata (IN); Charles Muchiri Wachira, Karatina (KE); Aisha Walcott, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 17/069,904

(22) Filed: Oct. 14, 2020

(65) Prior Publication Data

US 2022/0114219 A1 Apr. 14, 2022

(51) Int. Cl.
| | |
|---|---|
| *G06N 20/00* | (2019.01) |
| *G06F 16/9032* | (2019.01) |
| *G09B 7/02* | (2006.01) |
| *G09B 19/02* | (2006.01) |

(52) U.S. Cl.
CPC ....... *G06F 16/90332* (2019.01); *G06N 20/00* (2019.01); *G09B 7/02* (2013.01); *G09B 19/025* (2013.01)

(58) Field of Classification Search
CPC ...... G06N 20/00; G06F 16/90332; G09B 7/02
See application file for complete search history.

(56) References Cited

U.S. PATENT DOCUMENTS

| | | | | |
|---|---|---|---|---|
| 9,864,949 | B1* | 1/2018 | Astigarraga | ........... G06N 3/006 |
| 2012/0041903 | A1* | 2/2012 | Beilby | .................... H04L 51/02 |
| | | | | 706/11 |
| 2014/0189027 | A1* | 7/2014 | Zhang | .................... H04L 51/02 |
| | | | | 709/206 |
| 2014/0337989 | A1* | 11/2014 | Orsini | ................... H04L 51/212 |
| | | | | 726/26 |
| 2016/0352657 | A1* | 12/2016 | Galley | .................. H04L 51/226 |
| 2018/0096619 | A1 | 4/2018 | Fuka | |

(Continued)

OTHER PUBLICATIONS

Disclosed Anonymously, "Amazon Alexa Official Site," https://developer.amazon.com/en-US/alexa, Jun. 4, 2020, pp. 1-2.

(Continued)

*Primary Examiner* — Nhat Huy T Nguyen
(74) *Attorney, Agent, or Firm* — Elliot J. Shine

(57) ABSTRACT

The exemplary embodiments disclose a method, a computer program product, and a computer system for replying to user commands. The present invention may include receiving a command for information from one or more devices of a user. The present invention may include collecting preferences of the user from a database and collecting user context from the one or more devices. The present invention may include identifying an appropriate manner of reply for the command based on the presences of the user and the user context. The present invention may include generating the appropriate reply to the command based on an identified manner of reply for the command using one or more machine learning models. The present invention may include transmitting the appropriate reply to the one or more devices of the user.

19 Claims, 5 Drawing Sheets

(56)                References Cited

U.S. PATENT DOCUMENTS

| | | |
|---|---|---|
| 2018/0365567 A1 | 12/2018 | Kolavennu |
| 2019/0057703 A1 | 2/2019 | Zeinstra |
| 2019/0304447 A1 | 10/2019 | Scavo |
| 2019/0371312 A1 | 12/2019 | Naughton |
| 2019/0371343 A1 | 12/2019 | Tukka |
| 2019/0388785 A1* | 12/2019 | Kumar ................ G10L 15/1815 |
| 2020/0027456 A1 | 1/2020 | Kim |
| 2020/0064456 A1* | 2/2020 | Xu ........................ G01S 13/765 |

OTHER PUBLICATIONS

Disclosed Anonymously, "Kids-Try-to-Stump-Alexa," video, CNET.
com, https://www.cnet.com/videos/kids-try-to-stump-alexa/, Nov. 23,
2016, pp. 1-2.
Disclosed Anonymously, "Method and System for AI Based Voice
Response System Providing Required Information in a Proactive
Manner," IP.com Prior Art Database Technical Disclosure, IP.com
No. IPCOM000259302D, https://ip.com/IPCOM/000259302, Jul.
26, 2019, pp. 1-4.
Mell et al., "The NIST Definition of Cloud Computing", National
Institute of Standards and Technology, Special Publication 800-145,
Sep. 2011, pp. 1-7.
Rosenwald, "How Millions of Kids Are Being Shaped by Know-
it-all Voice Assistants," The Washington Post, https://www.
washingtonpost.com/local/how-millions-of-kids-are-being-shaped-
by-know-it-all-voice-assistants/2017/03/01/c0a644c4-ef1c-11e6-b4ff-
ac2cf509efe5_story.html, Mar. 2, 2017, pp. 1-5.

* cited by examiner

100

DETERMINING DEVICE ASSISTANT MANNER OF REPLY

BACKGROUND

The exemplary embodiments relate generally to artificial intelligence, and more particularly to using artificial intelligence to reply to a user command or question.

Many people interact with internet of things devices (IoT devices) that assist them by answering questions or commands. Users of IoT devices may wish for their IoT devices to reply to questions in different manners depending on the user's input and context of the user's input. For example, a parent of a child may wish for their smart speaker assistant to answer their child's questions about mathematics concepts, but to not answer their child's questions asking for mathematics problems to be solved for them. The parent may wish for their smart speaker to answer all of the child's mathematics-related questions regardless of the types of questions during the week prior to the child's mathematics exam or while the child is engaged in a tutoring lesson with a mathematics tutor.

SUMMARY

The exemplary embodiments disclose a method, a computer program product, and a computer system for replying to a user. The exemplary embodiments may include a user asking one or more questions to one or more devices, collecting data of the user and data of the one or more commands, extracting one or more features from the collected data, and determining an appropriate reply and manner of reply based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
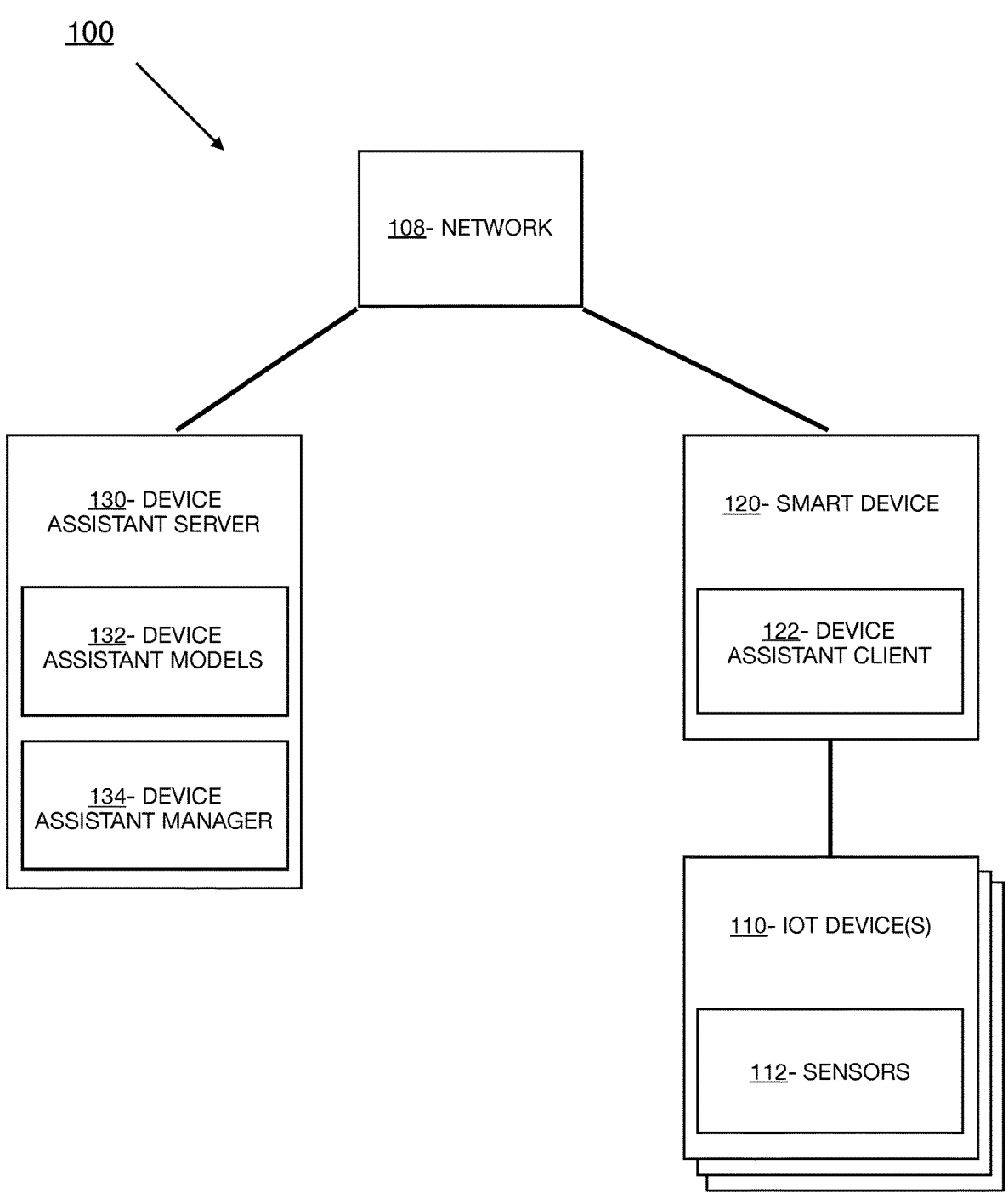
FIG. 1 depicts an exemplary schematic diagram of a device assistant system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people interact with internet of things devices (IoT devices) that assist them by answering questions or commands. Users of IoT devices may wish for their IoT devices to reply to questions in different manners depending on the user's input and context of the user's input. For example, a parent of a child may wish for their smart speaker assistant to answer their child's questions about mathematics concepts, but to not answer their child's questions asking for mathematics problems to be solved for them. The parent may wish for their smart speaker to answer all of the child's mathematics-related questions regardless of the types of questions during the week prior to the child's mathematics exam or while the child is engaged in a tutoring lesson with a mathematics tutor.

Exemplary embodiments are directed to a method, computer program product, and computer system for replying to a user's command or question. In embodiments, machine learning may be used to create models capable of determining a manner of reply to a user's command or question such as "answer fully," "answer partially," "give a hint," "do not answer," "delay answer," etc., while feedback loops may improve upon such models. Moreover, data from user uploads, databases, network 108, or the sensors 112 may be used to reply to a user's command or question. In embodiments, a command or question may refer to any user input such as a statement or question, and may be conveyed via audio, text, touch, gesture, eye movement, etc.

Many users of IoT devices may wish for their IoT devices to reply to their commands or questions in different manners depending on the type of command or question and the context of the command or question. For example, a parent of a child may wish for their smart speaker assistant to answer their child's questions about mathematics concepts, but to not answer their child's questions asking for mathematics problems to be solved for them. The parent may wish for their smart speaker to answer all of the child's mathematics-related questions regardless of the types of questions during the week prior to the child's mathematics exam or while the child is engaged in a tutoring lesson with a mathematics tutor. In another example, a user may be playing a game of Scrabble with friends and may ask their smart speaker assistant for word suggestions that use a specified combination of letters. The friends of the user may wish for the smart speaker assistant to not answer the user's question to prevent the user from gaining an unfair advantage in their game of Scrabble. In general, it will be appreciated that embodiments described herein may relate to aiding in replying to a user's commands or questions within any environment and for any motivation.

FIG. 1 depicts the device assistant system 100, in accordance with the exemplary embodiments. According to the exemplary embodiments, the device assistant system 100 may include one or more Internet of Things (IoT) devices 110, a smart device 120, and a device assistant server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the device assistant system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the IoT devices 110 may include one or more sensors 112 and may be one or more smart speaker, smart assistant, enterprise server, laptop computer, notebook, tablet computer, netbook computer, personal computer (PC), desktop computer, server, personal digital assistant (PDA), rotary phone, touchtone phone, smart phone, mobile phone, virtual device, thin client, virtual reality device, augmented reality device, or any other electronic device or computing system capable of receiving and sending data to and from other computing devices. While each IoT device 110 is shown as a single device, in other embodiments, each IoT device 110 may be comprised of a cluster or plurality of computing devices, in a modular manner, etc., working together or working independently. The IoT devices 110 are described in greater detail as a hardware implementation with reference to FIG. 3, as part of a cloud implementation with reference to FIG. 4, and/or as utilizing functional abstraction layers for processing with reference to FIG. 5.

In example embodiments, the sensors 112 may comprise a camera, microphone, light sensor, infrared sensor, movement detection sensor, pressure detection sensor, speedometer, accelerometer, gyroscope, global positioning system (GPS) sensor, or other sensory hardware equipment. Moreover, the IoT devices 110 may incorporate an array of the one or more sensors 112 such that information can be obtained by the sensors 112 in multiple directions, at different times/intervals, in different mediums/frequencies, and the like. For example, the IoT devices 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation.

While the sensors 112 are depicted as integrated with the IoT devices 110, in embodiments, the sensors 112 may be incorporated within an environment in which the device assistant system 100 is implemented. For example, the sensors 112 may be one or more microphones built into an auditorium, a camera built into a facility, speedometer, accelerometer, spectrometer, pedometer, etc. Moreover, data processing techniques may be implemented such that directional information of visual and audio data can be obtained based on signals received by each of the sensors 112, such as trilateration and triangulation. In other embodiments, the sensors 112 may be integrated with other smart devices, e.g., smart phones and laptops, within an environment implementing the device assistant system 100. In such embodiments, the sensors 112 may communicate directly with other networks and devices, such as the network 108. The sensors 112 are described in greater detail as a hardware implementation with reference to FIG. 3, as part of a cloud implementation with reference to FIG. 4, and/or as utilizing functional abstraction layers for processing with reference to FIG. 5.

In the example embodiment, the smart device 120 includes a device assistant client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The device assistant client 122 may act as a client in a client-server relationship. The device assistant client 122 may also be a software and/or hardware application capable of communicating with and providing a user interface for a user to interact with a server, for example the device assistant server 130, via the network 108. Moreover, in the example embodiment, the device assistant client 122 may be capable of transferring data from the IoT devices 110 and/or the sensors 112 between the smart device 120 and other devices via the network 108. In embodiments, the device assistant client 122 utilizes various wired and wireless connection protocols for data transmission and exchange, including Bluetooth, 2.4 gHz and 5 gHz internet, near-field communication, Z-Wave, Zigbee, etc. The device assistant client 122 is described in greater detail with respect to FIG. 2.

In the exemplary embodiments, the device assistant server 130 may include one or more device assistant models 132 and a device assistant manager 134, and may act as a server in a client-server relationship with the device assistant client 122. The device assistant server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the device assistant server 130 is shown as a single device, in other embodiments, the device assistant server 130 may be comprised of a cluster or plurality of computing devices, working together or working independently. The device assistant server 130 is described in greater detail as a hardware implementation with reference to FIG. 3, as part of a cloud implementation with reference to FIG. 4, and/or as utilizing functional abstraction layers for processing with reference to FIG. 5.

The device assistant models 132 may be one or more algorithms modelling a correlation between one or more features detected by the sensors 112 and an appropriate manner of replying to a user's command or question. In the example embodiment, the device assistant models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of the one or more features being indicative of an appropriate manner of reply to a user's command or question. In embodiments, such features may relate to a user's command or question and include a topic, importance, urgency, tone, etc. Such features may additionally relate to a context of a user's command or question and include an action, activity, importance, urgency, etc. The device assistant models 132 may weight the features based on an effect that the features have on determining an appropriate manner of reply to a user's command or question. The device assistant models 132 are described in greater detail with reference to FIG. 2.

In the exemplary embodiments, the device assistant manager 134 may be a software and/or hardware program capable of collecting training data, extracting features from the training data, and training one or more models based on the extracted features. The device assistant manager 134 may additionally be capable of configuring a session and collecting data of the user and the user's command or question. The device assistant manager 134 may further extract features from the collected data and apply one or more models to the extracted features to determine an appropriate manner of reply to the user's command or question. Moreover, the device assistant manager 134 may be further configured for determining an appropriate reply to the user's command or question, replying to the user's command or question, evaluating whether the user's command or question was appropriately replied to, and adjusting the one or more models. The device assistant manager 134 is described in greater detail with reference to FIG. 2.

Figure 2:
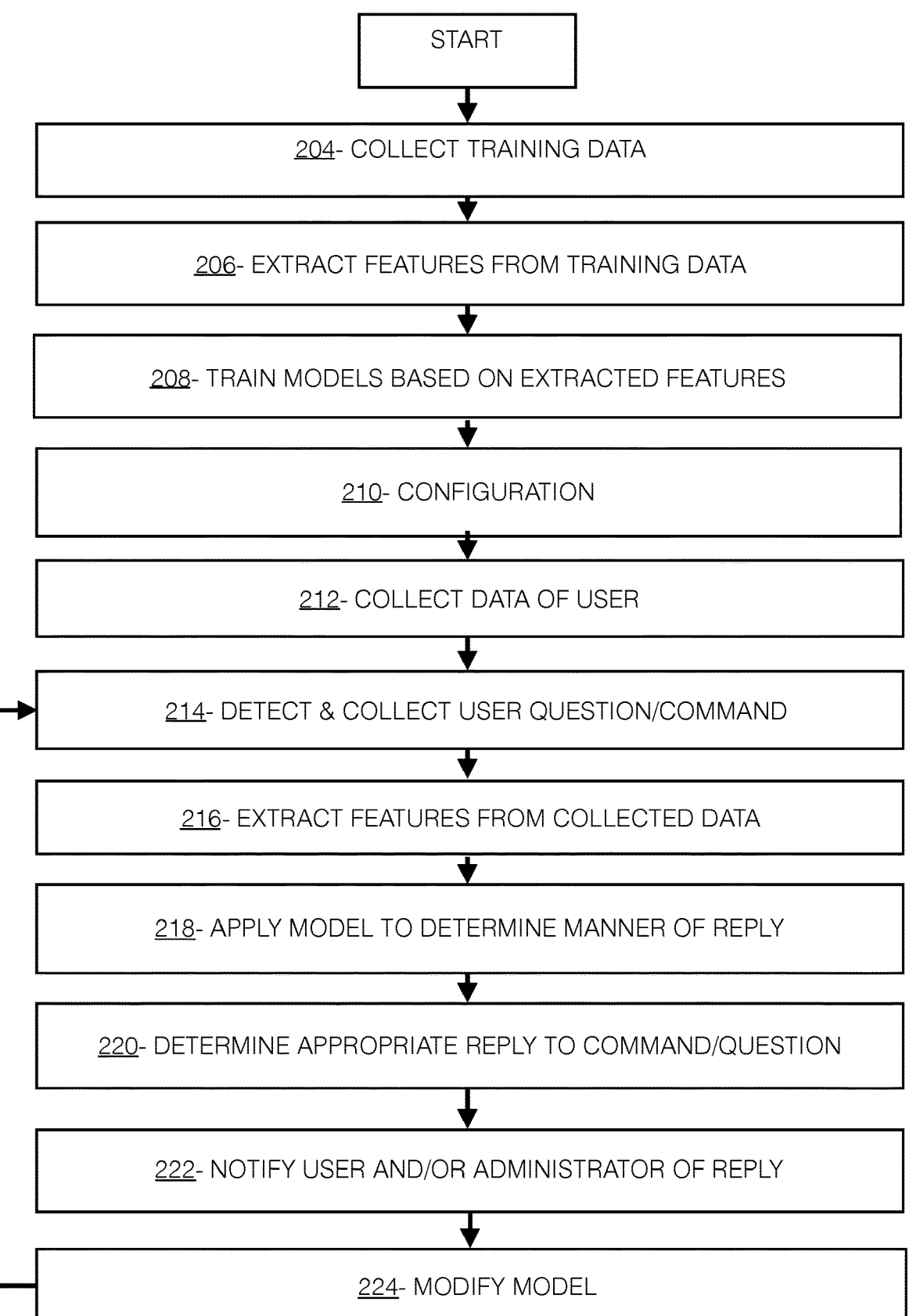
FIG. 2 depicts an exemplary flowchart illustrating the operations of a device assistant manager 134 of the device assistant system 100 in replying to a user's command or question, in accordance with the exemplary embodiments.

FIG. 2 depicts an exemplary flowchart illustrating the operations of a device assistant manager 134 of the device assistant system 100 in managing multiple commands, in accordance with the exemplary embodiments. In exemplary embodiments, the device assistant manager 134 first implements a training phase in which it trains the device assistant models 132 using labelled training data from previous user interactions with one or more IoT devices 110. The device assistant manager 134 then moves on to an operational phase in which it applies the trained device assistant models 132 to one or more current user commands or questions in order to determine an appropriate manner of reply to the commands or questions.

The device assistant manager 134 may collect and/or receive training data (step 204). In embodiments, the training data may be sourced from one or more previous user interactions with one or more IoT devices 110. Training data may include data of a user's one or more commands or questions and context of the commands or questions labelled with an appropriate manner of reply to the commands or questions. For example, training data may include a user's question, "What is fourteen multiplied by six?" and the user's calendar data showing a mathematics exam in four weeks labelled with appropriate manner of reply, "do not answer." In another example, training data may include a user's question, "What is fourteen multiplied by six?" and the user's calendar data showing a mathematics exam the following day labelled with appropriate manner of reply, "give a hint." In another example, training data may include a user's question, "How do I perform double digit multiplication?" labelled with appropriate manner of reply, "answer fully" regardless of when the user's calendar data shows a mathematics test is scheduled to take place. In embodiments, training data may further include data of an appropriate response to the commands or questions for syntax training purposes. For example, training data may include template sentences such as "The answer is [answer]" associated with appropriate manner of reply "answer fully." Training data template sentences may include "The answer may be [correct answer] or [incorrect answer]" and "Here is a hint: [hint]" associated with appropriate manner of reply "give a hint." Training data template sentences may further include "Sorry, I cannot answer that" associated with appropriate manner of reply "do not answer." The device assistant manager 134 may mirror the syntax of received template sentences when determining an appropriate reply to a user's commands or questions. The device assistant manager 134 may collect training data from microphones and video cameras, which may be built into the user's IoT devices 110. The device assistant manager 134 may retrieve training data via user upload, databases, or the sensors 112. In embodiments, the device assistant manager 134 may collect training data via the sensors 112 as one or more microphones built into an auditorium, a camera built into a facility, etc. The collected training data may be related to a user's command or question and include topics, importance, urgency, tone, etc., and/or additionally may be related to a context of a user's command or question and include actions, activities, pointing, waving, eye direction/movement, importance, urgency, etc.

To further illustrate the operations of the device assistant manager 134, reference is now made to an illustrative example where the device assistant manager 134 collects labelled training data of previous user interactions with IoT devices 110, and template sentences "The answer is [answer]" associated with appropriate manner of reply "answer fully," "The answer may be [correct answer] or [incorrect answer]" and "Here is a hint: [hint]" associated with appropriate manner of reply "give a hint," and "Sorry, I cannot answer that" associated with appropriate manner of reply "do not answer." For each user interaction, the device assistant manager 134 collects data of a user's command or question to an IoT device 110 labelled with the IoT device 110's appropriate manner of reply to the command or question.

The device assistant manager 134 may extract one or more features from the collected and/or received training data (step 206). The extracted features may be extracted from the audio, video, etc. data and/or databases, and may include features related to a user's command or question including topics, importance, urgency, tone, etc., and/or additionally may be related to a context of a user's command or question including actions, activities, pointing, waving, eye direction/movement, importance, urgency, etc. In embodiments, the device assistant manager 134 may use techniques such as feature extraction, natural language processing, named entity recognition, optical character recognition, image processing, audio processing, pattern/template matching, data comparison, convolutional neural networks, Mel frequency cepstral coefficient based extraction, etc. to identify features relating to a user's command or question such as topics, importance, urgency, tone, etc. For example, if audio data of a user calmly asking, "How do I multiply fractions?" is collected as training data, the device assistant manager 134 may extract math, multiplication, and fractions as topics, low importance, low urgency, and a calm tone. If audio data of a user panicking while asking, "How do I treat a broken finger?" is collected as training data, the device assistant manager 134 may extract topics "medicine," and "finger," high importance, high urgency, and a panicked tone. The device assistant manager 134 may later associate extracted features with the labelled appropriate manner of reply when training one or more models.

In addition to extracting user speech features related to a user's command or question including topics, importance, urgency, tone, etc., the device assistant manager 134 may also extract features relating to a context of a user's command or question such as actions, activities, pointing, waving, eye direction/movement, importance, urgency, etc. from the collected training data (step 206 continued). In embodiments, the device assistant manager 134 may use techniques such as feature extraction, image processing, pattern/template matching, data comparison, convolutional neural networks, etc. to identify contextual features of a user such as actions, activities, pointing, waving, eye direction/movement, importance, urgency, etc. For example, if video is collected of a user sitting in front of a computer looking at a mathematics assignment and pointing at a specific mathematics problem, the device assistant manager 134 may extract the user's activity as completing a mathematics assignment, eye direction towards the mathematics assignment, and pointing towards the mathematics problem. The device assistant manager 134 may additionally extract an importance and/or urgency from data of a context of a user, and the device assistant manager 134 may determine that activities or actions of a user that are riskier have a higher importance and/or urgency. For example, if video data is collected of a user giving medical care to somebody, the device assistant manager 134 may extract a high importance and urgency. If video data is collected of a user playing a video game, the device assistant manager 134 may extract a low importance and urgency. In embodiments, the device assistant manager 134 may consider data from a user's calendar in determining an importance or urgency of a user's question. For example, if a user asks how to spell a word and the user's calendar shows that they have a spelling test the following day, the device assistant manager 134 may extract a high importance and urgency. If a user asks a physics question and the user's calendar shows no physics examinations for the next three weeks, the device assistant manager 134 may extract a low importance and urgency. The device assistant manager 134 may later associate extracted contextual features with the labelled appropriate manner of reply when training one or more models.

With reference to the previously introduced example where the device assistant manager 134 collects template sentences and data of user commands and questions to an IoT device 110 labelled with the IoT device 110's appropriate manners of reply to the commands and questions, the device assistant manager 134 extracts speech features related to the user's commands and questions such as topics, importance, urgency, tone, etc. as well as contextual features such as actions, activities, pointing, waving, eye direction/eye movement, importance, urgency, etc. from the collected training data with respect to previously received user interactions.

The device assistant manager 134 may train one or more device assistant models 132 based on the extracted features (step 208). The device assistant manager 134 may train one or more device assistant models 132 based on an association of the one or more extracted features with the one or more appropriate manners of reply. As previously mentioned, such extracted features may include speech features relating to a user's command or question such as topics, importance, urgency, tone, etc. as well as contextual features such as actions, activities, pointing, waving, eye direction/movement, importance, urgency, etc. and the one or more appropriate manners of reply may include "do not answer," "give a hint," "answer fully," "delay answer," etc. The one or more device assistant models 132 may be generated through machine learning techniques such as neural networks, and the device assistant manager 134 may train the one or more device assistant models 132 to weight the features such that features shown to have a greater correlation with determining an appropriate manner of reply are weighted greater than those features that are not. In embodiments, the device assistant models 132 may include a model for each user. In other embodiments, the device assistant manager 134 may simply train one device assistant model 132 to be later applied to all users. Based on the device assistant models 132's extracted features and weights associated with such extracted features, the device assistant manager 134 may later determine which manner of reply is appropriate for one or more user commands or questions as well as what answers to the commands or questions are appropriate.

With reference to the previously introduced example where the device assistant manager 134 extracts speech features related to the user's commands and questions such as topics, importance, urgency, tone, etc. as well as contextual features such as actions, activities, pointing, waving, eye direction/eye movement, importance, urgency, etc. from the collected training data with respect to previously received user interactions, the device assistant manager 134 trains a model for each user of the collected training data.

The device assistant manager 134 may receive a configuration (step 210). Having trained the one or more device assistant models 132, the device assistant manager 134 may now apply the one or more device assistant models 132 to one or more user commands in real time. The device assistant manager 134 may first, however, receive a user configuration by receiving a user registration and user preferences. The user registration may be uploaded by a user, i.e., a person using or wearing the IoT devices 110 of the device assistant system 100 or administrator, i.e., a person overseeing the user's usage of the device assistant system 100 (such as a parent or guardian of the user, employer of the user, etc.) and the configuration may be received by the device assistant manager 134 via the device assistant client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial numbers, one or more smart device 120 types, IoT devices 110 types, sensors 112 types, and the like. Receiving a user registration may also involve receiving or extracting data from databases such as user calendar data, social media data, health data, academic data, etc. Lastly, the device assistant manager 134 may receive a configuration of the one or more sensors 112, whether they be fixed to one or more devices (e.g., the smart device 120 or one or more of the IoT devices 110) or fixed within an environment in which the device assistant system 100 is implemented.

During configuration, the device assistant manager 134 may further receive user preferences (step 210 continued). User preferences may include preferences for the manner in which the device assistant manager 134 should reply to one or more user commands or questions. For example, user preferences may specify notifying an administrator (i.e. a parent or guardian of a user, employer of a user, etc.) and/or waiting for feedback or confirmation from the administrator before replying to a user's command or question. For example, a parent of a user may upload user preferences requiring that the parent be notified of the user's questions or commands and determined appropriate replies to the questions or commands for approval or confirmation prior to the device assistant manager 134's replies to the user's questions or commands.

With reference to the previously introduced example where the device assistant manager 134 trains a model for each user of the collected training data, the device assistant manager 134 receives a user registration via user upload including the user's name, administrator's name (parent of the user), type of smart device 120, type of smart speaker IoT device 110, type of sensors 112 including a microphone and video camera located on the smart speaker, and links to databases containing user calendar data and academic data. The device assistant manager 134 also receives user preferences via user upload specifying that the administrator (parent of the user) is to be notified of the user's questions and determined appropriate replies to the questions via visual feedback on the administrator's smart device 120 for approval or confirmation by the administrator prior to the device assistant manager 134 replying to the user.

The device assistant manager 134 may collect data of the user (step 212). In embodiments, the device assistant manager 134 may collect data of the user such as user calendar data, social media data, health data, academic data, etc. from one or more databases uploaded during configuration. In embodiments, the device assistant manager 134 may additionally collect data of the user from one or more sensors 112, which may include one or more microphones built into an auditorium, a camera built into a facility, etc. In embodiments, the device assistant manager 134 may continuously collect data of the user in anticipation of a user command or question. Anticipation may be based on user movement, for example detected by one or more sensors 112. Anticipation may be based on the user entering a geofence or connecting to network 108. The collected data of the user may relate to a context of a user's commands or questions including actions, activities, pointing, waving, eye direction/movement, importance, urgency, etc.

With reference to the previously introduced example where the device assistant manager 134 receives a user registration and user preferences, the device assistant manager 134 collects calendar and academic data of the user from the databases uploaded during configuration. The device assistant manager 134 additionally collects contextual data of the user from the microphone and video camera on the smart speaker.

The device assistant manager 134 may detect and collect data of one or more commands of the user (step 214). In embodiments, the device assistant manager 134 may detect one or more commands by way of a trigger, and may be triggered via a toggle switch, button, slider, etc. that may be selected by the user manually using a button/touchscreen/etc., by voice (trigger word, trigger phrase), by eye movement, and the like. For example, the device assistant manager 134 may detect a user command by detecting the user tapping their IoT device 110 twice or saying "command." In embodiments, the device assistant manager 134 may utilize natural language processing to continuously monitor for one or more commands of the user.

Upon detecting one or more commands of the user, the device assistant manager 134 may collect data of the one or more commands (step 214 continued). In embodiments, the device assistant manager 134 may begin collecting data when receiving a trigger from the user. As previously discussed, the device assistant manager 134 may be triggered via a toggle switch, button, slider, etc. that may be selected by the user manually by hand using a button/touchscreen/etc., by voice (trigger word, trigger phrase), etc. Alternatively, the device assistant manager 134 may continuously collect data of a user in anticipation of one or more commands. Anticipation may be based on user movement, for example detected by one or more sensors 112. Anticipation may be based on the user entering a geofence or connecting to network 108. The device assistant manager 134 may retrieve data of one or more user commands via the sensors 112, which may include one or more microphones built into an auditorium, a camera built into a facility, etc. The collected data may be related to user speech and include topics, importance, urgency, tone, etc. The collected data may additionally relate to a context of a user's commands or questions including actions, activities, pointing, waving, eye direction/movement, importance, urgency, etc.

With reference to the previously introduced example where the device assistant manager 134 collects calendar and academic data of the user from the databases uploaded during configuration as well as contextual data of the user from the microphone and video camera on the smart speaker, the device assistant manager 134 detects the user asking, "What is 14 multiplied by 6?" and collects video data from video cameras and audio data from microphones of the user's speech and context while asking the question.

The device assistant manager 134 may extract one or more features from the collected and/or received data (step 216). The device assistant manager 134 may extract one or more features from the collected and/or received data in the same manner as described with reference to step 206, however here the features are extracted not from the training data, but rather from the data of the current command or question.

With reference to the previously introduced example where the device assistant manager 134 collects video data from video cameras and audio data from microphones of the user asking, "What is 14 multiplied by 6?" the device assistant manager 134 extracts the below features in Table 1 from the collected data.

TABLE 1

| Extracted Features | |
| --- | --- |
| topics | mathematics, multiplication |
| importance | low |
| urgency | low |
| tone | calm |
| actions | completing mathematics assignment |
| activities | mathematics homework |
| pointing | towards mathematics problem "14 × 6" |
| eye direction | towards mathematics assignment |

The device assistant manager 134 may apply one or more models to the extracted features to determine an appropriate manner of reply to a user's command or question (step 218). As previously mentioned, such extracted features may be related to a user's command or question and include topics, importance, urgency, tone, etc. The extracted features may additionally relate to a context of a user's command or question and include actions, activities, pointing, waving, eye direction/movement, importance, urgency, etc., and the one or more device assistant models 132 may be generated through machine learning techniques such as neural networks. In embodiments, the one or more device assistant models 132 may be trained at initialization and/or through the use of a feedback loop to weight the features such that features shown to have a greater correlation with determining an appropriate manner of reply are weighted greater than those features that are not. Based on the extracted features and weights associated with such extracted features, the device assistant manager 134 may determine an appropriate manner of reply to a user's command or question such as "answer fully," "answer partially," "give a hint," "do not answer," "delay answer," etc.

With reference to the previously introduced example where the device assistant manager 134 extracts features from the collected data, the device assistant manager 134 applies the previously trained model to determine that the appropriate manner of reply is to give a hint to the user.

Upon determining an appropriate manner of reply, the device assistant manager 134 may determine an appropriate reply to the user's question or command (step 220). The device assistant manager 134 may determine an appropriate reply to the user's question or command by searching the internet via network 108. In embodiments, the device assistant manager 134 may determine an appropriate reply to the user's question or command based on the determined appropriate manner of reply. For example, if the device assistant manager 134 determines that the appropriate manner of reply to a user's question is "answer fully," the device assistant manager 134 may search the internet to fully answer the user's question and determine that the answer from the internet is an appropriate reply to the user's question. If the device assistant determines that the appropriate manner of reply to a user's question is "do not answer," the device assistant manager 134 may simply determine that the appropriate reply to the user is, "Sorry, I cannot answer that question." If the device assistant manager 134 determines that the appropriate reply to a user's question is "give a hint," the device assistant manager 134 may search the internet for a suitable hint relating to the user's question and determine that the hint is an appropriate reply to the user's question. In embodiments, the device assistant manager 134 may determine a structure or syntax of an appropriate reply to a user's question or command by mirroring one or more template sentences received as training data. In embodiments, the device assistant manager 134 may be configured alternatively to determine an appropriate reply to a user's question or command.

With reference to the previously introduced example where the device assistant manager 134 applies a model to determine that the appropriate manner of reply is to give a hint to the user, the device assistant manager 134 searches the internet via network 108 and uses a template sentence previously received during training to determine that "Here is a hint: six times 4 equals 24" is an appropriate reply to the user's question.

Upon the device assistant manager 134 determining both an appropriate manner of reply and appropriate reply to a user's question or command, the device assistant manager 134 may notify one or more parties of the appropriate reply (step 222). In embodiments, the device assistant manager 134 may notify the user and/or the administrator of the determined appropriate reply to the user's question or command. The device assistant manager 134 may convey the one or more responses to the user and/or administrator in the form of audio, video, text, or any other manner via the smart device 120 and/or one or more IoT devices 110. In embodiments, the device assistant manager 134 may notify the user and/or administrator of multiple appropriate replies all at one time. In other embodiments, the device assistant manager 134 may notify the user and/or administrator of one appropriate reply at a time in a queue, and the device assistant manager 134 may await feedback from the user and/or administrator indicative of whether one or more of the replies are appropriate. As discussed with reference to configuration, the device assistant manager 134 may notify the user and/or administrator of the appropriate one or more replies according to the user preferences of configuration. In embodiments, the device assistant manager 134 may be configured for receiving user and/or administrator input acknowledging, dismissing, and/or affirming that one or more replies are suitable and/or that one or more replies should be conveyed to the user in response to the user's command or question. In embodiments where the device assistant manager 134 is configured to notify the administrator of a reply for confirmation and/or approval prior to notifying the user of a reply, the device assistant manager 134 may reply to the user upon receiving confirmation or approval from the administrator.

With reference to the previously introduced example where the device assistant manager 134 searches the internet via network 108 and uses a template sentence previously received during training to determine that "Here is a hint: six times 4 equals 24" is an appropriate reply to the user's question, the device assistant manager 134 notifies the administrator (parent of the user) of the reply on the administrator's smart device 120. The administrator approves the reply, and the device assistant manager 134 subsequently replies to the user's question with, "Here is a hint: six times 4 equals 24."

The device assistant manager 134 may evaluate and modify the device assistant models 132 (step 224). In the example embodiment, the device assistant manager 134 may verify whether the one or more replies were appropriate and/or helpful in order to provide a feedback loop for modifying the device assistant models 132. In embodiments, the feedback loop may simply provide a means for the user and/or administrator to indicate whether the reply was appropriate and/or helpful to the user. The feedback loop indication may be triggered via a toggle switch, button, slider, etc. that may be selected by the user and/or administrator manually by hand using a button/touchscreen/etc., by voice, and the like. Based on the device assistant manager 134 appropriately or inappropriately replying to the user's command or question, the device assistant manager 134 may modify the device assistant models 132. In other embodiments, the device assistant manager 134 may infer or deduce whether the reply was helpful to the user. For example, the device assistant manager 134 may interpret user dialogue via natural language processing to determine whether the reply was helpful to the user. For example, if the user says, "That doesn't help at all" or other expressions indicative of a user's dissatisfaction, the device assistant manager 134 may infer that the reply was inappropriate and modify the device assistant models 132 accordingly. Based on feedback received in the above or any other manners, the device assistant manager 134 may then modify the device assistant models 132 to more accurately reply to commands and questions.

With reference to the previously introduced example where the administrator approves the reply, and the device assistant manager 134 subsequently replies to the user's question with, "Here is a hint: six times 4 equals 24" the user says, "Thank you, that helps" and the device assistant manager 134 modifies the device assistant models 132 accordingly.

Figure 3:
FIG. 3 depicts an exemplary block diagram depicting the hardware components of the device assistant system 100 of FIG. 1, in accordance with the exemplary embodiments.
Figure 3:
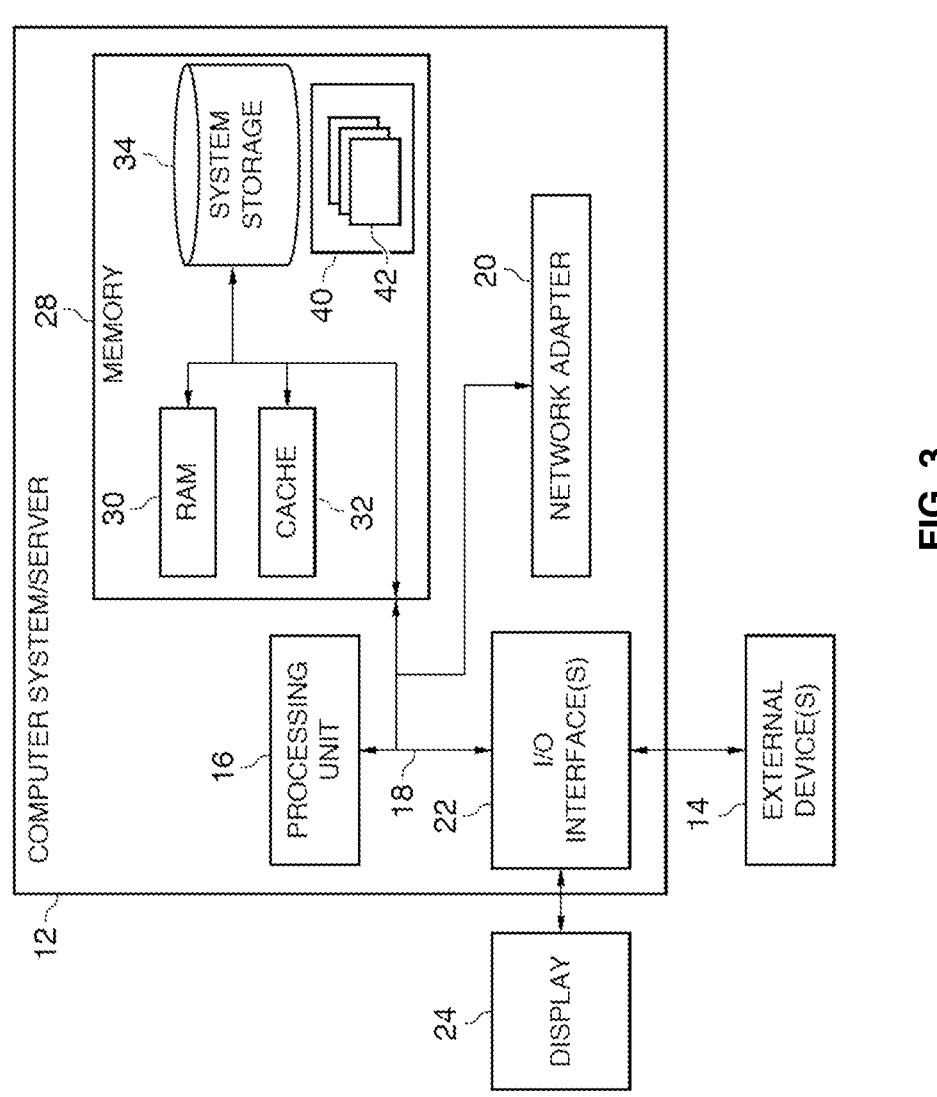

FIG. 3 depicts a block diagram of devices within the device assistant system 100 of FIG. 1, in accordance with exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
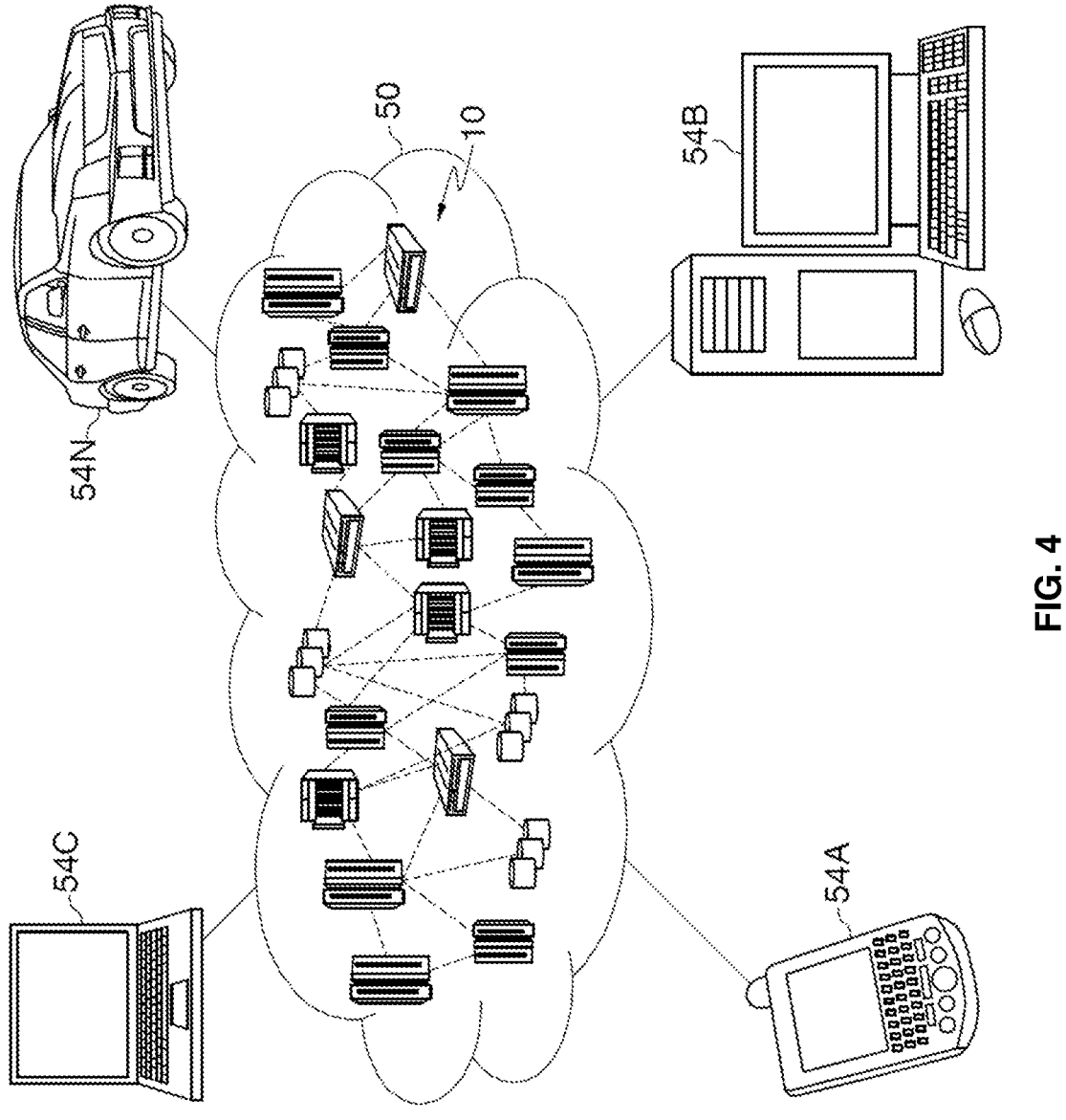
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
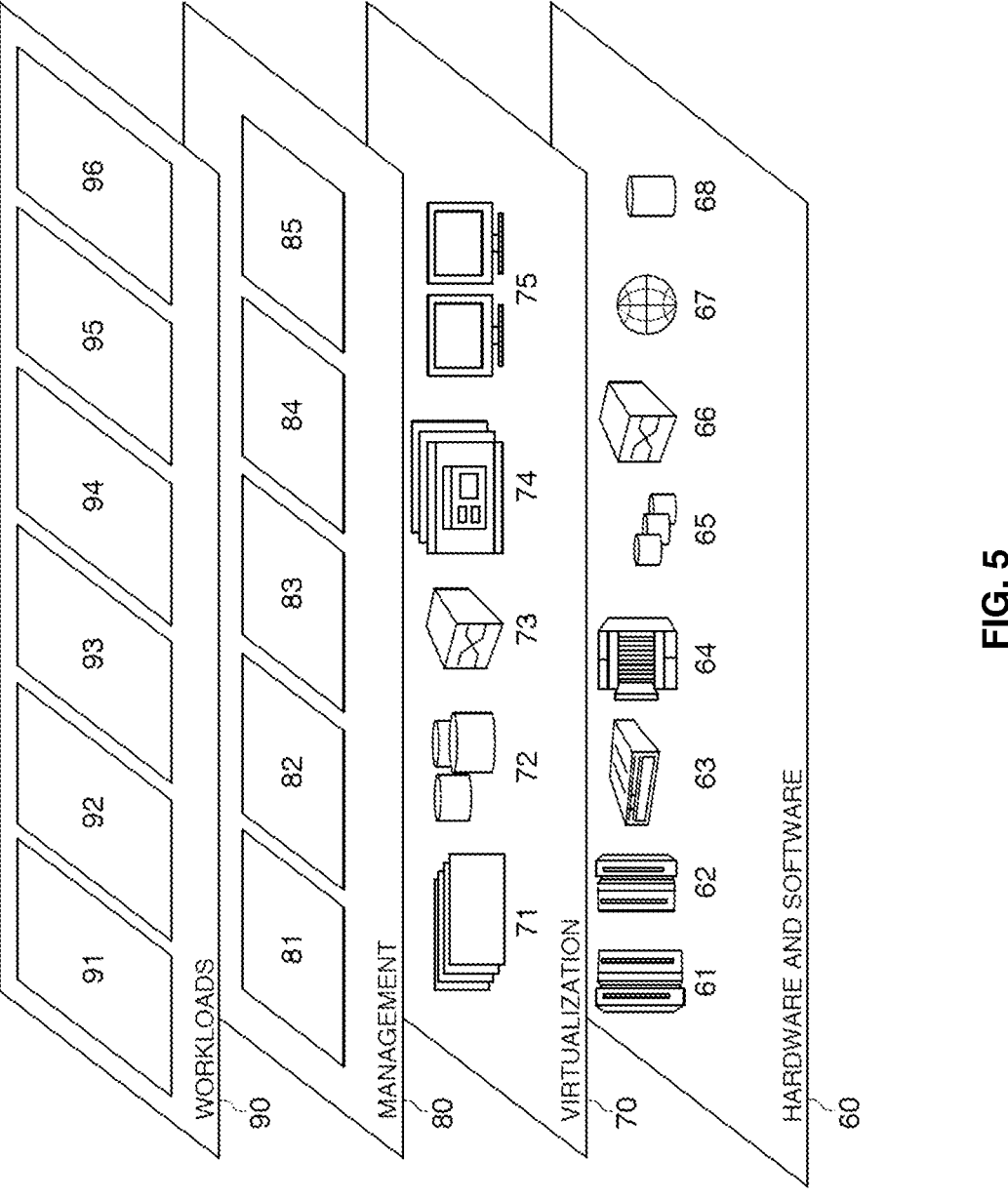
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device assistant management 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for replying to user commands, the method comprising:

receiving a command for information from a first user of one or more devices, wherein the one or more devices are associated with at least two users;

collecting preferences of the first user from a database and collecting user context from the one or more devices;

extracting a plurality of features of the command based on the preferences and the user context collected, wherein the plurality of features include at least a topic and an activity corresponding to the command;

identifying an appropriate manner of reply for the command using one or more machine learning models based on the plurality of features extracted, wherein the one or more machine learning models is trained to weight the plurality of features according to a correlation with the appropriate manner of reply, and wherein the appropriate manner of reply indicates a completeness of the information to include in an appropriate reply to the first user;

generating the appropriate reply to the command based on an identified manner of reply for the command using the one or more machine learning models, wherein the appropriate reply to the command is a hint, wherein prior to a transmitting of the appropriate reply to the first user of the one or more devices, notifying an administrator of the appropriate reply, and receiving a confirmation or approval of the appropriate reply from the administrator;

transmitting the appropriate reply to the first user of the one or more devices following the approval of the appropriate reply by the administrator;

determining a usefulness of the hint based on feedback received from the first user, wherein the feedback is utilized in adjusting the one or more machine learning models for the first user;

anticipating a new command for information from a second user based on the second user entering a geofence of the one or more devices;

collecting preferences of the second user from the database and user context data for the second user from the one or more devices;

retrieving, from a queue, at least two or more hints and an answer to the new command based on the plurality of appropriate replies identified for the new command using the one or more machine learning models, wherein the one or more machine learning models utilize at least the preferences of the second user and the user context data for the second user collected from the one or more devices in anticipation of the new command;

transmitting a first hint of the two or more hints to the second user;

transmitting, in response to negative feedback received for the first hint, a second hint of the two or more hints to the second user;

transmitting the answer to the second user of the one or more devices; and determining whether the answer to the new command is helpful to the second user based on an interaction of the second user with the answer, retraining the one or more machine learning models for the second user based on the interaction of the second user with the answer and the feedback associated with the at least two or more hints.

2. The method of claim 1, wherein identifying the appropriate manner of the reply for the command further comprises:

collecting training data from previous commands or questions previously received from the first user and template sentences, wherein the previous commands or the questions and the template sentences are labeled with an appropriate reply;

extracting one or more training features from the training data; and training the one or more machine learning models to identify the appropriate manner of the reply for the command by weighing the plurality of features of the command based on a weighting of the one or more training features extracted from the training data from the previous commands or the questions labeled with the appropriate reply.

3. The method of claim 2, wherein the one or more training features are selected from a group consisting of: topics, importance, urgency, tone, actions, activities, pointing, waving, eye directions, and eye movements.

4. The method of claim 2, wherein the one or more training features are extracted from the training data received from one or more sensors associated with one or more Internet of Things (IoT) devices, and wherein the one or more training features are analyzed using the one or more machine learning models.

5. The method of claim 1, wherein the approval from the administrator is received via visual feedback from a smart device of the administrator.

6. The method of claim 1, further comprising:

identifying the plurality of appropriate replies the new command based on the preferences of the second user and the user context data for the second user collected in anticipation of the new command.

7. The method of claim 6, further comprising:

generating the answer to the new command based on the plurality of appropriate replies identified for the new command using the one or more machine learning models, wherein the one or more machine learning models are trained for each of the at least two users of the one or more devices.

8. The method of claim 1, further comprising:

receiving approval from the administrator for the at least two or more hints and the answer.

9. The method of claim 1, wherein the user context collected from the one or more devices includes at least audio context and video context, and wherein the preferences collected for the first user include at least calendar data and academic data.

10. The method of claim 9, further comprising:

determining the topic is an academic topic and the activity is an academic assignment corresponding to the command based on the user context and the preferences collected for the first user.

11. The method of claim 9, wherein the plurality of features further include an urgency, a tone, and an eye direction of the first user, and wherein the urgency and the tone are determined based on the audio context and the eye direction is determined based on the video context.

12. A computer program product for replying to user commands, the computer program product comprising:

one or more non-transitory computer-readable storage media and program instructions stored on the one or more non-transitory computer-readable storage media capable of performing a method, the method comprising:

receiving a command for information from a first user of one or more devices, wherein the one or more devices are associated with at least two users;

collecting preferences of the first user from a database and collecting user context from the one or more devices;

extracting a plurality of features of the command based on the preferences and the user context collected, wherein the plurality of features include at least a topic and an activity corresponding to the command;

identifying an appropriate manner of reply for the command using one or more machine learning models based on the plurality of features extracted, wherein the one or more machine learning models is trained to weight the plurality of features according to a correlation with the appropriate manner of reply, and wherein the appropriate manner of reply indicates a completeness of the information to include in an appropriate reply to the first user;

generating the appropriate reply to the command based on an identified manner of reply for the command using the one or more machine learning models, wherein the appropriate reply to the command is a hint, wherein prior to a transmitting of the appropriate reply to the first user of the one or more devices, notifying an administrator of the appropriate reply, and receiving a confirmation or approval of the appropriate reply from the administrator;

transmitting the appropriate reply to the first user of the one or more devices following the approval of the appropriate reply by the administrator;

determining a usefulness of the hint based on feedback received from the first user, wherein the feedback is utilized in adjusting the one or more machine learning models for the first user;

anticipating a new command for information from a second user based on the second user entering a geofence of the one or more devices;

collecting preferences of the second user from the database and user context data for the second user from the one or more devices;

retrieving, from a queue, at least two or more hints and an answer to the new command based on the plurality of appropriate replies identified for the new command using the one or more machine learning models, wherein the one or more machine learning models utilize at least the preferences of the second user and the user context data for the second user collected from the one or more devices in anticipation of the new command;

transmitting a first hint of the two or more hints to the second user;

transmitting, in response to negative feedback received for the first hint, a second hint of the two or more hints to the second user;

transmitting the answer to the second user of the one or more devices; and determining whether the answer to the new command is helpful to the second user based on an interaction of the second user with the answer, retraining the one or more machine learning models for the second user based on the interaction of the second user with the answer and the feedback associated with the at least two or more hints.

13. The computer program product of claim 12, wherein identifying the appropriate manner of the reply for the command further comprises:

collecting training data from previous commands or questions previously received from the first user and template sentences, wherein the previous commands or the questions and the template sentences are labeled with an appropriate reply;

extracting one or more training features from the training data; and training the one or more machine learning models to identify the appropriate manner of the reply for the command by weighing the plurality of features of the command based on a weighting of the one or more training features extracted from the training data from the previous commands or the questions labeled with the appropriate reply.

14. The computer program product of claim 13, wherein the one or more training features are selected from a group consisting of: topics, importance, urgency, tone, actions, activities, pointing, waving, eye directions, and eye movements.

15. The computer program product of claim 12, wherein the user context collected from the one or more devices includes at least audio context and video context, and wherein the preferences collected for the first user include at least calendar data and academic data.

16. The computer program product of claim 15, further comprising:

determining the topic is an academic topic and the activity is an academic assignment corresponding to the command based on the user context and the preferences collected for the first user.

17. The computer program product of claim 15, wherein the plurality of features further include an urgency, a tone, and an eye direction of the first user, and wherein the urgency and the tone are determined based on the audio context and the eye direction is determined based on the video context.

18. A computer system for replying to user commands, the computer system comprising:

one or more computer processors, one or more computer-readable storage media, and program instructions stored on the one or more of the computer-readable storage media for execution by at least one of the one or more processors capable of performing a method, the method comprising:

receiving a command for information from a first user of one or more devices, wherein the one or more devices are associated with at least two users;

collecting preferences of the first user from a database and collecting user context from the one or more devices;

extracting a plurality of features of the command based on the preferences and the user context collected, wherein the plurality of features include at least a topic and an activity corresponding to the command;

identifying an appropriate manner of reply for the command using one or more machine learning models based on the plurality of features extracted, wherein the one or more machine learning models is trained to weight the plurality of features according to a correlation with the appropriate manner of reply, and wherein the appropriate manner of reply indicates a completeness of the information to include in an appropriate reply to the first user;

generating the appropriate reply to the command based on an identified manner of reply for the command using the one or more machine learning models, wherein the appropriate reply to the command is a hint, wherein prior to a transmitting of the appropriate reply to the first user of the one or more devices, notifying an administrator of the appropriate reply, and receiving a confirmation or approval of the appropriate reply from the administrator;

transmitting the appropriate reply to the first user of the one or more devices following the approval of the appropriate reply by the administrator;

determining a usefulness of the hint based on feedback received from the first user, wherein the feedback is utilized in adjusting the one or more machine learning models for the first user;

anticipating a new command for information from a second user based on the second user entering a geofence of the one or more devices;

collecting preferences of the second user from the database and user context data for the second user from the one or more devices;

retrieving, from a queue, at least two or more hints and an answer to the new command based on the plurality of appropriate replies identified for the new command using the one or more machine learning models, wherein the one or more machine learning models utilize at least the preferences of the second user and the user context data for the second user collected from the one or more devices in anticipation of the new command;

transmitting a first hint of the two or more hints to the second user;

transmitting, in response to negative feedback received for the first hint, a second hint of the two or more hints to the second user;

transmitting the answer to the second user of the one or more devices; and determining whether the answer to the new command is helpful to the second user based on an interaction of the second user with the answer, retraining the one or more machine learning models for the second user based on the interaction of the second user with the answer and the feedback associated with the at least two or more hints.

19. The computer system of claim 18, wherein identifying the appropriate manner of the reply for the command further comprises:

collecting training data from previous commands or questions previously received from the first user and template sentences, wherein the previous commands or the questions and the template sentences are labeled with an appropriate reply;

extracting one or more training features from the training data; and training the one or more machine learning models to identify the appropriate manner of the reply for the command by weighing the plurality of features of the command based on a weighting of the one or more training features extracted from the training data from the previous commands or the questions labeled with the appropriate reply.

* * * * *